(No Model.)  2 Sheets—Sheet 1.
C. FROST.
CAR COUPLING.
No. 532,272. Patented Jan. 8, 1895.
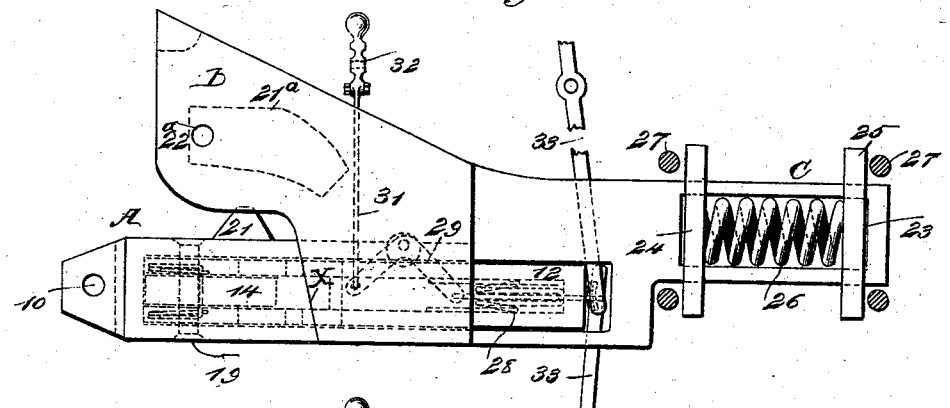
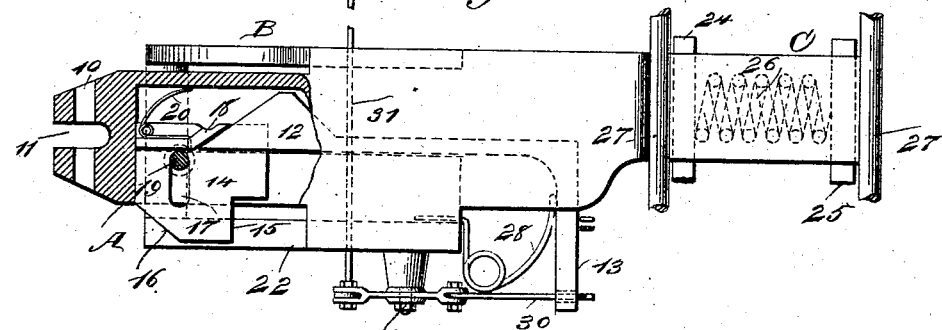
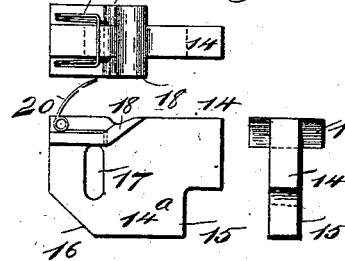
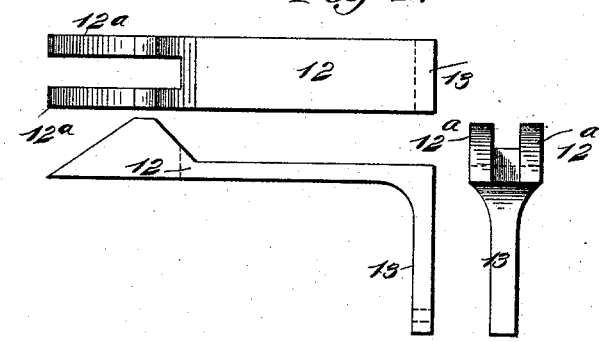
WITNESSES:
INVENTOR
C. Frost
BY
Munn & Co.
ATTORNEYS.

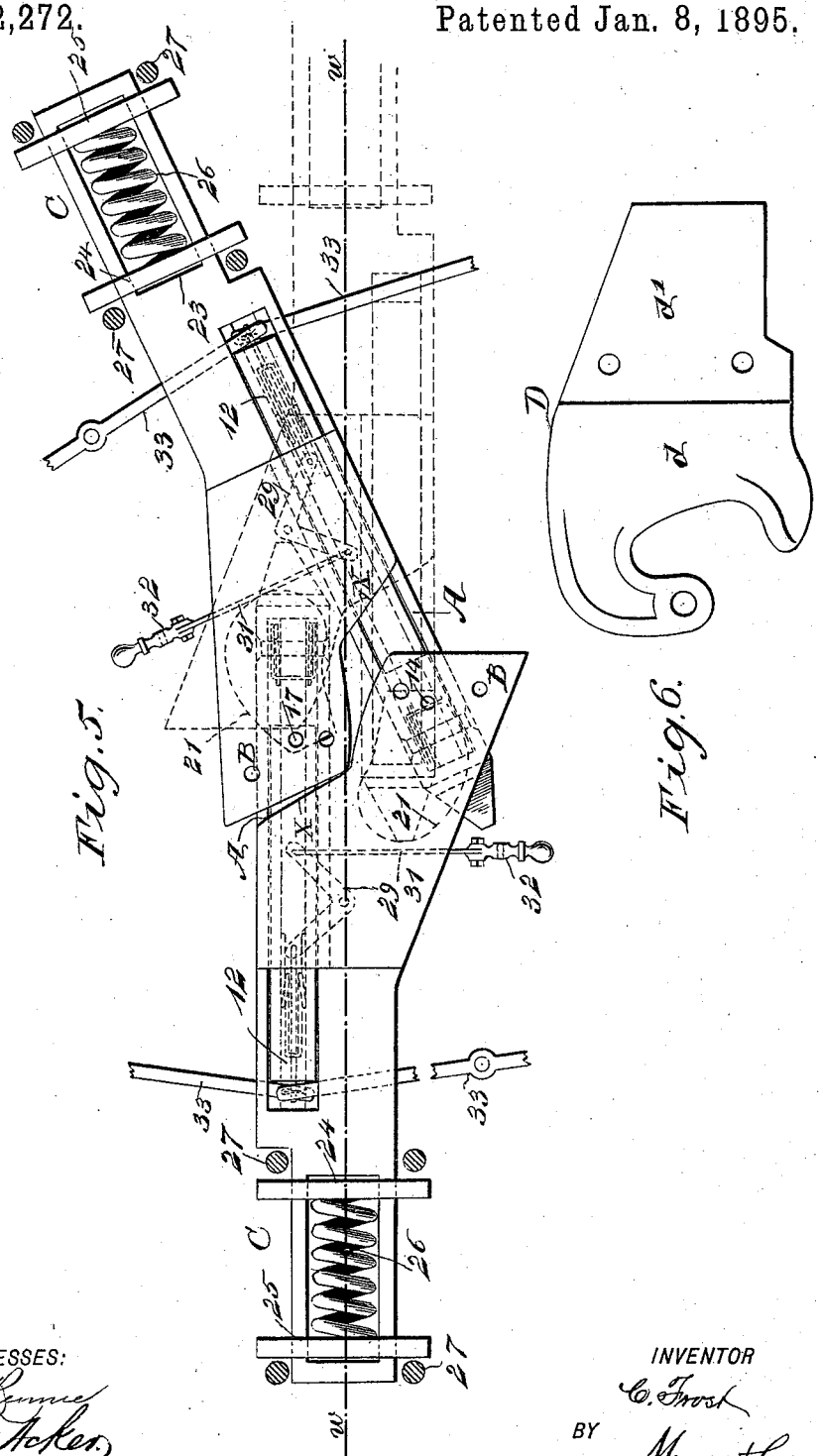

UNITED STATES PATENT OFFICE.

CARMAN FROST, OF HEWLETT'S, NEW YORK.

CAR-COUPLING.

SPECIFICATION forming part of Letters Patent No. 532,272, dated January 8, 1895.

Application filed March 19, 1894. Serial No. 504,198. (No model.)

*To all whom it may concern:*

Be it known that I, CARMAN FROST, of Hewlett's, in the county of Queens and State of New York, have invented a new and useful Improvement in Car-Couplers, of which the following is a full, clear, and exact description.

My invention relates to an improvement in car couplers, and it has for its object to improve upon the construction of the car couplers shown and described in the patent granted to me December 12, 1893, No. 510,854, the improvement consisting in providing a gravity coupling dog which will automatically couple with an opposing drawhead, by being first raised through contact with the drawhead and then dropping of its own weight into the socket prepared to receive it, and whereby also a spring may be applied to the coupling dog to insure its returning to its coupling or normal position and remaining straight while in said position.

A further object of the invention is to provide a slide adapted to act upon the coupling dog in a manner to elevate said dog and hold it in an elevated position to effect a coupling.

Another feature of the invention consists in the construction of a car coupling in which a pin section will be combined with a drawhead section, the two sections being placed substantially side by side and located in such manner that the line of draft will be immediately through the center of the drawbar and the center of the coupling proper.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a plan view of the improved coupler. Fig. 2 is a side elevation thereof, a portion of the side being broken away. Fig. 3 represents respectively a plan, side elevation and edge view of the coupling dog. Fig. 4 represents respectively a plan view, a side elevation and an edge view of a slide employed in uncoupling the dog. Fig. 5 is a plan view of two of the drawheads coupled, one coupling being at an angle to the other, the coupling out of alignment being shown in straight position in dotted lines; and Fig. 6 is a plan view of a knuckle adapted to be inserted in the drawhead to couple with an opposing knuckle coupler.

The coupler is constructed practically in two sections, a coupling section A and a drawhead section B. The coupling section at its forward or outer end is beveled at its top, bottom and sides, preferably in direction of its center, being provided with a vertical recess 10 to receive a coupling pin when the coupler is to be used in connection with an opposing link and pin coupler; and the coupling section is further provided with a horizontal opening 11 communicating with the opening 10, the horizontal opening or recess being adapted to receive a link.

Within the coupling section A of the coupler a slide 12 has guided movement, the coupling section being grooved or otherwise provided with slide-ways to receive the slide. The slide at its outer end is bifurcated, as shown in Fig. 4, the bifurcated parts being designated at 12ª; and the bifurcated portion of the slide is more or less triangular in side elevation, as shown in Figs. 2 and 4.

The slide at its rear end is provided with a downwardly extending arm 13, whereby the slide is manipulated in a manner to be hereinafter set forth. The slide 12 is adapted for use in connection with a coupling dog 14. This dog is shown in detail in Fig. 3, and comprises a body 14ª, provided preferably with a recess 15 at its rear bottom portion and a beveled or inclined front lower face 16. The coupling dog is also provided with a vertical slot 17, located preferably between its center and its forward end, and over the slot 17 at the upper portion of the coupling dog opposing side flanges 18, are constructed, which flanges are horizontal or straight at the front portion of the coupling dog and are upwardly inclined at their rear ends, the inclined portions of the flanges being adapted for engagement with the forward inclined faces of the bifurcated portion of the slide 12, as illustrated.

The coupling dog is held within the coupling section A of the coupler by passing a pin 19 through the slot 17 of the dog, said pin being firmly held in the said coupling section, as illustrated in dotted lines in Fig. 1; and in order that the coupling dog shall be held in its lower position ready for coupling, and in order that it may be quickly and positively returned to its lower position when elevated from any cause, a spring 20, is made to bear upon the upper forward portion of the coupling dog and against the upper wall of the said coupling section as illustrated in Fig. 2.

The drawhead B is preferably carried over the coupling section A, and between the inner side of the forward portion of the drawhead and the corresponding face of the coupling section a space is made to intervene, as shown in Fig. 1, and a triangular block or lug 21, is made to extend across this space into the mouth of the drawhead, in order that an opposing coupling section will be compelled to enter the said drawhead. The drawhead is likewise provided with an opening 22 in its bottom wall, said opening being adapted to receive the coupling dog 14; and an aperture $22^a$ is likewise made in the drawhead to receive a pin should the drawhead be required to couple with an opposing drawhead of the link and pin type.

The drawhead and coupling sections are practically one casting or forging at the rear of the coupler, and the drawbar section C, is made usually integral with the united portions of the drawhead and coupling sections at one side of the latter, the drawbar section being so located that a line drawn through the drawbar center will likewise pass approximately centrally between the drawhead B and the coupling section A. The drawbar section is provided with a slot or opening 23 in which two opposing slides 24 and 25 have movement, a spring 26 being located between said slides. The coupler is usually affixed to the car through the medium of clips 27, located at its drawbar section, or any equivalent thereof may be used.

The slide 12 is held out of lifting engagement with the coupling dog yet in engagement with its flange by means of a spring 28, which may be of any character and may be applied in any approved manner but preferably, as shown in the drawings, the spring has bearing against the rear end of the bottom portion of the coupling section A, and likewise against the extension 13 of the slide. Thus when the slide is drawn in direction of the coupling dog it will compress the spring 28, and when the slide is released it will return to its normal position.

The slide may be moved in many ways, one of which is shown in the drawings, and it consists in pivoting below the coupling section A a bell crank lever 29, one member of which is connected by a link 30 with the lower end of the slide extension 13, while the other end of the lever is connected by a link 31 with a hand lever 32, adapted to be fulcrumed to any support at the side of the car or side of the platform, and this form of lever is primarily used as a platform lever, and by drawing the lever in direction of the coupling section, the elbow lever 29 will be rocked upon its fulcrum in such a manner as to draw the slide 12 forward, and the slide will travel down the inclined surface of the flange 18 of the coupling dog, and then to an engagement with the straight surface of the flange, lifting the coupling dog a sufficient distance to disengage it from any object with which it had been in contact.

Upon freight cars, or other cars in which an uncoupling is to be effected at the sides thereof, two levers 33, are employed, and these levers are fulcrumed to any support on the under portion of the car, and their inner ends are made to bear against the extension 13 of the slide 12. Thus by drawing the said levers 33 in direction of the opposite end of the car the inner ends of the levers will force the slide in an inwardly direction and thereby carry the coupling dog to its uncoupling position.

When a coupling is to be effected, the coupling section of one coupler will enter the drawhead section of the opposing coupler, and the coupling dogs will be automatically lifted as they enter the drawhead sections, and will then drop into the openings $21^a$ in the said drawhead sections, as shown in Fig. 5. It will be observed that the line of draft W, W, in both couplings is purely a central one.

When two opposing drawheads are coupled, the draft openings 21 in each drawhead section will be practically in transverse alignment, whereby the draft tension upon both couplers is equalized. In Fig. 5 I have illustrated the inclined buffing face of the drawhead section more sharply inclined than the corresponding face in Fig. 1, as by so doing I am enabled as shown in the said Fig. 5 to couple and uncouple, both dogs being in operation when the cars are upon a curve having a radius of at least twenty-five degrees, and if only one dog is brought into action the coupling and uncoupling may be made upon a curve of forty degrees radius.

It is frequently necessary to couple with an opposing drawhead of the knuckle type. In this event the knuckle D, shown in Fig. 6, including the hook body $d$ and shank $d'$ may be employed. The shank is slipped into the mouth of the drawhead section D, of the coupler and secured by bolts passed through suitable apertures in said section and shank.

Having thus described my invention, I claim as new and desire to secure by Letters Patent—

1. A car coupler provided with a coupling section, a coupling dog loosely located in the said section, capable of rising and falling, being adapted to gravitate downward, a drawbar section located at one side of the coupling section and provided with a keeper to receive the coupling dog of an opposing coupler, and a slide having an inclined face and adapted to meet a corresponding face on the coupling dog, as and for the purpose set forth.

2. A car coupler comprising a coupling section, a coupling dog located within said section, adapted to have free upward and downward movement, said coupling dog being provided with a vertical slot and flanges at each side of its upper portion, a pin passed through the slot of the coupling dog and secured in the coupling section, a slide having inclined faces adapted to engage with the flanges of the coupling dog, a drawhead section located at one side of the coupling section and provided with a keeper, and means, substantially as shown and described, for manipulating the slide, as and for the purpose set forth.

3. A car coupler, comprising a drawhead, a coupling dog located in said drawhead, provided with a vertical slot and flanges at its upper forward portion upon opposite faces, said flanges being provided with an inclined rear face and a straight forward face, a spring having bearing against the coupling section and against the upper portion of the coupling dog, a slide bifurcated at one end to receive the coupling dog, and provided with inclined faces meeting corresponding faces on the dog flanges, a pin supporting the coupling dog in the coupling section, being passed through the slot thereof, a drawhead located at one side of the coupling section and provided with a keeper, a drawbar section located at the rear of the coupler and centrally with respect to its forward end, and shifting levers, substantially as shown and described, acting upon the said slide, as and for the purpose specified.

CARMAN FROST.

Witnesses:
J. FRED ACKER,
C. SEDGWICK.